(12) United States Patent
Morita et al.

(10) Patent No.: US 6,626,082 B2
(45) Date of Patent: Sep. 30, 2003

(54) TABLE FEED SYSTEM

(75) Inventors: Hiromichi Morita, Kariya (JP); Goshin Ohashi, Kariya (JP); Sojiro Tsuchiya, Nagoya (JP); Hisatoshi Kojima, Toyota (JP); Takayoshi Muto, Gifu (JP); Hironao Yamada, Gifu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/941,937

(22) Filed: Aug. 30, 2001

(65) Prior Publication Data

US 2002/0026869 A1 Mar. 7, 2002

(30) Foreign Application Priority Data

Aug. 30, 2000 (JP) ........................................ 2000-260747

(51) Int. Cl.[7] .............................................. F15B 11/08
(52) U.S. Cl. ............................................. 91/465; 91/466
(58) Field of Search ........................ 91/463, 465, 466, 91/454; 451/24

(56) References Cited

U.S. PATENT DOCUMENTS 4,086,730 A  * 5/1978 Kobayashi et al. ........... 451/24
5,743,165 A  * 4/1998 Tanaka et al. ................ 91/454

FOREIGN PATENT DOCUMENTS

| JP | A-58-82643 | 5/1983 |
| JP | A-8-150527 | 6/1996 |

* cited by examiner

Primary Examiner—Edward K. Look
Assistant Examiner—Thomas E. Lazo
(74) Attorney, Agent, or Firm—Posz & Bethards, PLC

(57) ABSTRACT

In a machine tool by pulse drive of a hydraulic system, a piston of a hydraulic cylinder is connected with a table, and an outflow valve and an inflow valve, which form a pair, are respectively connected with a right and a left hydraulic chamber. When the feed table is moved to the right, for example, control is conducted so that the valve-opening period of one valve can be a portion in the middle of the valve-opening period of the other valve. Since a portion of pressure in the hydraulic chamber is canceled, an effective pressure, the pulse width of which is narrow, remains. Accordingly, even in the case where a common inexpensive electromagnetic valve is used, it is possible to accomplish a smooth feed motion.

18 Claims, 13 Drawing Sheets

Fig.2

| VALVE CONTROL SIGNAL | FEED DIRECTION: RIGHT (DIRECTION OF +y) | |
|---|---|---|
| | STEP FEED | SMOOTH FEED |
| LEFT FEED OUTFLOW VALVE 1 | ──────── | ──────── |
| RIGHT FEED INFLOW VALVE 2 | ⎍⎍⎍ | ⎍⎍⎍ |
| LEFT FEED INFLOW VALVE 3 | ──────── | ──────── |
| RIGHT FEED OUTFLOW VALVE 4 | ⎍⎍⎍ | ⎍⎍⎍⎍ |

SIMULTANEOUS OPENING AND CLOSING OF VALVE
(PHASE DIFFERENCE 0°)

OPENING AND CLOSING BY VALVE PHASE DIFFERENCE
(PHASE DIFFERENCE 180°)

DEFINITION OF SMOOTHNESS

TABLE FEED SYSTEM

BACKGROUND OF THE INVENTION

1. Field of the Invention

The present invention relates to a table feed system for moving and positioning a feed table of a machine tool.

2. Description of the Related Art

Concerning a table feed system for moving and positioning a feed table of a machine tool, a motor-driven type table feed system, in which a servo motor and a ball screw are combined with each other so as to conduct numerical control (NC control), is commonly used at present. In the case where high accuracy, high output and high rigidity are required for cutting and grinding in the operation of a machine tool, it is necessary to use a large-scale, complicated and expensive table feed system. When mirror face work is conducted in the field of precision work, feed marks, which are caused by the feed command, are transferred onto the work face. Therefore, quality of the mirror face is impaired.

On the other hand, concerning the hydraulic type table feed system, although the hydraulic type table feed system is small-scale and the output is high, its structure can be made simple. However, the energy transmission medium used in this system is a liquid such as a hydraulic fluid. Since liquid has compressibility and relatively high viscosity, it is not appropriate as an energy transmission medium to be used in numerical control in which a high response property is generally required. Therefore, at present, the hydraulic type table feed system is not often applied to a system in which highly accurate table feed is required. Especially, the hydraulic type table feed system is seldom used in the table feed system of a machine tool, the operation speed of which is high, in which high accuracy, of the micron order, is required.

However, as one of the few examples in which a hydraulic cylinder is applied to the table feed system of a machine tool for precision work, Japanese Unexamined Patent Publication No. 8-150527 discloses a technique for a hydraulic type table feed system. In this example, as a means for preventing feed marks from being transferred onto a work face in the process of mirror face work, a static pressure bearing for supporting a piston rod is combined with a hydraulic cylinder, and a static pressure coupling is interposed between the piston rod and the feed table. Due to the above structure, the feed table can be smoothly moved, so that the generation of feed marks, which are caused by pulsation of the hydraulic pressure and fluctuation of the piston shaft, can be prevented. However, the piston feed control system is the conventional flow rate control conducted by a proportional valve and others. Therefore, it is possible to realize a smooth feeding motion by this prior art, however, it is impossible to obtain a high positioning accuracy. The prior art has the above problems of controllability.

As the prior art, and to enhance controllability, Japanese Unexamined Patent Publication No. 58-82643 discloses a table feed system in which pneumatic pressure is utilized. According to this technique, a feed table is pulse-driven by ON-OFF valves, which can be easily controlled by a computer, so that a highly accurate feed motion can be accomplished. According to this table feed system, it is possible to enhance the positioning accuracy, however, feed marks appear on a work face because the feeding waveform is step-like.

SUMMARY OF THE INVENTION

The present invention has been accomplished to solve the above problems of the prior art by a new means. The first object of the present invention is to provide a table feed system for a machine tool, at low cost, which is capable of smoothly moving a table so that a mirror face can be made by realizing a highly accurate feed motion conducted by a pulse drive of high controllability by using a computer.

Specifically, the second object of the present invention is to extend control ranges of the feed speed and of the resolution by making a flow rate of hydraulic fluid to a hydraulic cylinder, for operating a table feed system, very small.

In the table feed system of the present invention, a pair of hydraulic chambers, one being arranged on the right and the other being arranged on the left, are formed in at least one hydraulic cylinder corresponding to the moving direction, to right and left, of the table feed of a machine tool, and a pressure adjusting mechanism is arranged, by which pressure of hydraulic fluid in each hydraulic chamber can be independently adjusted. The characteristic of this table feed system is described as follows. Pressure in the hydraulic chambers, one being arranged on the right and the other being arranged on the left, is independently increased and decreased by the pressure adjusting mechanism. When the piston is moved to the right and the left by the pressure difference between the hydraulic chambers, a time difference occurs between periods in which the pressure adjusting mechanism conducts an adjustment of pressure on the respective hydraulic chambers.

When a time difference occurs between periods in which the pressure adjusting mechanism conducts an adjustment of pressure on the respective hydraulic chambers as described above, when pressure in one hydraulic chamber is increased, pressure in the other hydraulic chamber is not simultaneously decreased. Therefore, at first, the piston is moved to a position at which pressure in both hydraulic chambers becomes an equilibrium condition. After that, when pressure in the other hydraulic chamber is decreased, the piston is moved to a position at which the decreased pressure in the other hydraulic chamber and pressure in one hydraulic chamber become an equilibrium condition. According to the increase and decrease in pressure in the right and the left hydraulic chamber, which are made with a time difference, the piston is smoothly moved little by little. Accordingly, even when a pressure adjusting mechanism such as a common electromagnetic valve, the minimum opening and closing period of which is long, is used, it is possible to obtain the same effect as that of a case in which the valve is opened for a period of time shorter than the minimum valve opening period. Therefore, it is possible to obtain a high controllability by an inexpensive system of a simple structure. Further, it is possible to finely adjust a flow rate of hydraulic fluid to the hydraulic cylinder by a pressure adjusting mechanism such a common electromagnetic valve. Therefore, highly accurate positioning can be done by a simple structure. Accordingly, ranges of controlling the feed speed and the resolution can be extended.

This table feed system utilizes hydraulic pressure, which has seldom been used in recent years. However, this table feed system can be formed into a digital system when valves composing the pressure adjusting mechanism are subjected to duty control by a stream of pulse signals. Therefore, controllability by the computer is high, and it is possible to provide the same effect as that of a case in which a valve, the minimum valve-opening period of which is very short, is used. Accordingly, a highly accurate feed can be easily realized at low cost. This table feed system utilizes hydraulic pressure and is different from the conventional motor-driven digital system. Therefore, due to a slight compressibility of hydraulic fluid, step portions of displacement are chamfered, so that a smooth motion can be made. Accordingly, in the process of machining or drilling, it is possible to reduce a sudden change in a load given to a cutting tool. Further, the hydraulic system is advantageous in that the damping property is high. Therefore, the hydraulic system can provide an effect that the occurrence of chatter marks is prevented.

This table feed system is characterized in that a time difference is provided between the time at which pressure adjustment is conducted on the right hydraulic chamber and the time at which pressure adjustment is conducted on the left hydraulic chamber. As an embodiment, it is possible to provide a phase difference between the duty control of the hydraulic fluid inflow valve of one hydraulic chamber and the duty control of the hydraulic fluid outflow valve of the other hydraulic chamber. As the most remarkable case, the phases are set to be opposite to each other. Even in the above case in which pulse-like hydraulic fluid flows into one hydraulic chamber and the table is moved in pulses by the pulsed flow of hydraulic fluid, when pulses of hydraulic fluid of the inverse phase is made to flow out from the other hydraulic chamber, the pulses are cancel each other. Therefore, the piston and the feed table can be smoothly and linearly moved and displaced.

When a setting is made in such a manner that the valve opening period in which one of the hydraulic fluid inflow valve and the hydraulic fluid outflow valve, which are arranged in the same hydraulic chamber, is opened for the hydraulic chamber of the hydraulic cylinder partially overlaps the valve opening period in which the other valve is opened for the hydraulic chamber or in such a manner that the valve opening period in which one of the hydraulic fluid inflow valve and the hydraulic fluid outflow valve is opened for the hydraulic chamber of the hydraulic cylinder is set longer than the valve opening period in which the other valve is opened for the hydraulic chamber, the pressure adjustment of the hydraulic chamber is canceled. As a result, the effective valve opening period is a difference between the valve-opening periods of the two valves, that is, the effective valve-opening period is short. For the above reasons, even if a common inexpensive valve, the minimum opening and closing period of which is relatively long, is used for a pressure adjustment mechanism, it is possible to provide a sufficiently high accuracy and response speed.

In order to solve the above problems, the present invention provides the following table feed system as a specific means.

In this table feed system, corresponding to the moving direction of the feed table of a machine tool to the right and left, a pair of hydraulic chambers, one being arranged on the right and the other being arranged on the left, are formed in at least one hydraulic cylinder, and an outflow valve for feeding to the left and an inflow valve for feeding to the right are connected with the left hydraulic chamber, and an inflow valve for feeding to the left and an outflow valve for feeding to the right are connected with the right hydraulic chamber. In this way, the pair of valves is connected with each hydraulic chamber. Further, there is provided a control means for independently controlling the pressure of hydraulic fluid in the pair of hydraulic chambers. When a stream of pulse signals is generated and the four valves are subjected to duty control, the valve can be opened or closed.

Consequently, according to this table feed system, a stream of pulse signals are supplied to the respective four valves by the control means, and the four valves are subjected to duty control so as to be opened and closed. Due to the foregoing, an arbitrary intensity of pressure can be given to the two hydraulic chambers. Since a pressure difference between the two hydraulic chambers can be arbitrarily controlled in this way, the piston and the feed table, which are moved by the pressure difference, can be moved to and stopped at an arbitrary position. Even when a common electromagnetic valve, the minimum opening and closing period of which is long, is used, it is possible to obtain the same effect as that of a case in which an electromagnetic valve, the minimum opening and closing period of which is short, is used for the valves. Therefore, it is possible to obtain high controllability by an inexpensive system of a simple structure. Further, it is possible to easily conduct a highly accurate positioning. Accordingly, the ranges of controlling the feed speed and resolution can be extended.

More particularly, the table feed system of the present invention can be composed as follows. There are provided a pair of hydraulic cylinders, wherein one is arranged on the right and the other is arranged on the left. The forward end portions of the piston rods of the right and the left hydraulic cylinder are made to come into contact with a table drive piece in such a manner that the forward end portions of the piston rods of the right and the left hydraulic cylinder are opposed to each other while the table drive piece connected with the feed table is being interposed between the forward end portions of the piston rods of the right and the left hydraulic cylinder. Due to the above structure, the piston rod of each piston pushes the table drive piece so as to move the feed table. In this case, the piston rod and the table drive piece are not moved in a different direction from the feed direction being linked with each other. Therefore, the piston rod is not given a force, the direction of which is different from the feed direction, by the weight and thermal expansion. The effect can be made certain when the forward end of each piston rod is chamfered so that the piston rod comes into contact with the table drive piece by point contact.

Even if a clearance formed between the hydraulic cylinder and the piston is extremely reduced, the sliding motion of the piston is not prevented. Therefore, it is possible to omit an O-ring made of rubber which is usually arranged to tightly seal this clearance. Since no O-ring is used in this structure, the hydraulic chamber of the hydraulic cylinder has no elasticity. For the above reasons, although it is a hydraulic type table feed system, fast response can be realized in control. When the valve is integrated with the cylinder block into one body and a flow path of hydraulic fluid connecting the valve with the hydraulic chamber in the hydraulic cylinder is formed in the cylinder block, rigidity of the flow path can be enhanced, which becomes a factor to enhance the response property of control. For the same reasons, it is preferable to abolish an O-ring used for tightly sealing a joint of a flow path for connecting the valve with the hydraulic chamber in the hydraulic cylinder. It is preferable to use a metal seal instead of the O-ring in this case.

BRIEF DESCRIPTION OF THE DRAWINGS

FIG. 2 is a table showing a stream of pulse signals impressed upon each valve.

FIGS. 7 and 8 are diagrams which are posted for comparison to show a difference in smoothness of displacement of a feed table which is caused by a difference in the phase between the inflow side valve and the outflow side valve of a hydraulic cylinder, wherein FIG. 7 shows a case of the same phase and FIG. 8 shows a case of an inverse phase.

DESCRIPTION OF THE PREFERRED EMBODIMENT

Figure 1:
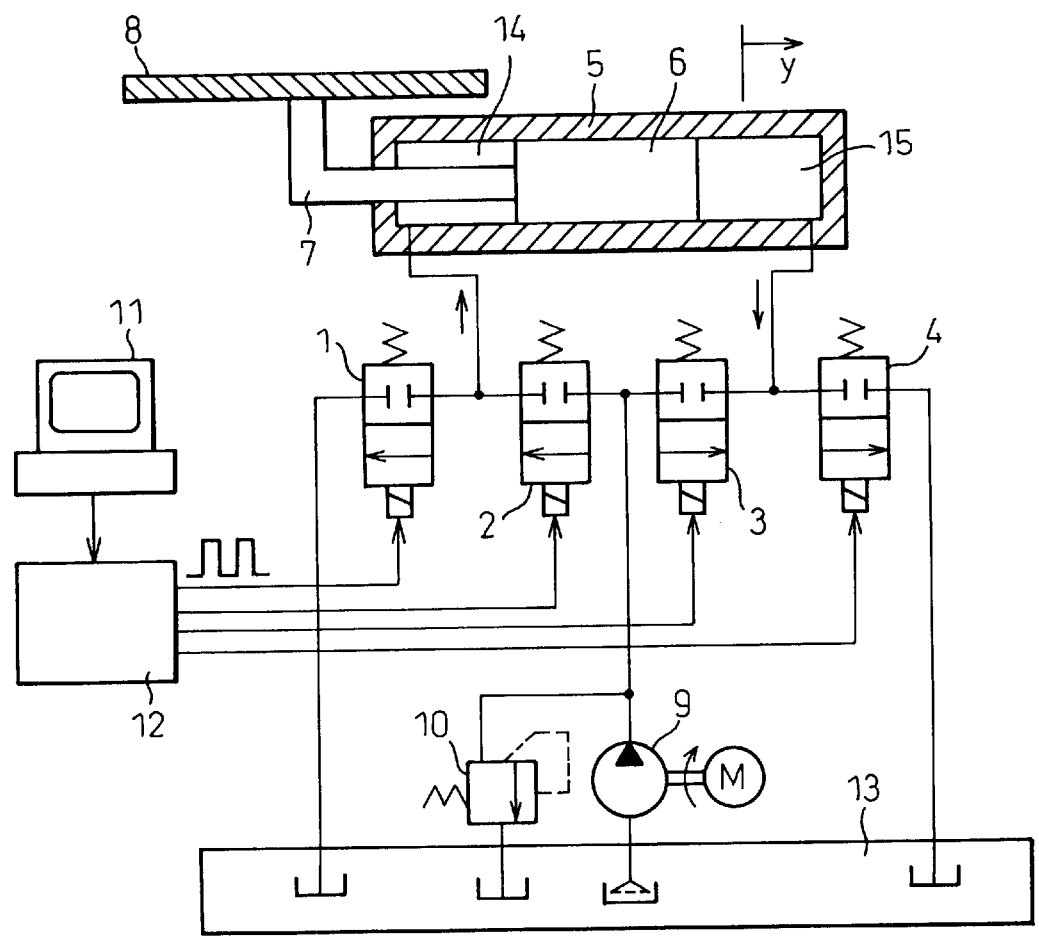
FIG. 1 is an overall arrangement of a hydraulic type table feed system of the first embodiment.

FIG. 1 is a view showing a hydraulic type table feed system of the first embodiment of the present invention. In this system, there are provided four ON-OFF valves 1, 2, 3, 4 for the single rod double acting type hydraulic cylinder 5. The feed table 8 is driven and moved by this single rod double acting type hydraulic cylinder 5. The feed table 8 is attached to the piston rod 7, and the piston rod 7 is connected with the piston 6. Accordingly, the piston 6 is moved to the right and left by a change in pressure in a pair of hydraulic chambers 14, 15 in the hydraulic cylinder 5, which is caused by the operation of the valves 1 to 4.

The hydraulic chamber 14 on the left of the piston 6 provided in the hydraulic cylinder 5 is connected with the left feed outlet valve 1 for feeding the table 8 to the left and also connected with the right feed inflow valve 2 for feeding the table 8 to the right. The left feed inflow valve 3 and the right feed outflow valve 4 are connected with the hydraulic chamber 15 provided on the right of the hydraulic cylinder 5, wherein the left feed inflow valve 3 and the right feed outflow valve 4 are arranged symmetrically with the left feed outflow valve 1 and the right feed inflow valve 2. The right feed inflow valve 2 and the left feed inflow valve 3 supply hydraulic fluid, which is sent from the hydraulic pump 9, into the hydraulic cylinder 5 when these valves are opened. On the other hand, the left feed outflow valve 1 and the right feed outflow valve 4 discharge hydraulic fluid from the hydraulic cylinder 5 into the tank 13 when these valves are opened.

Figure 3:
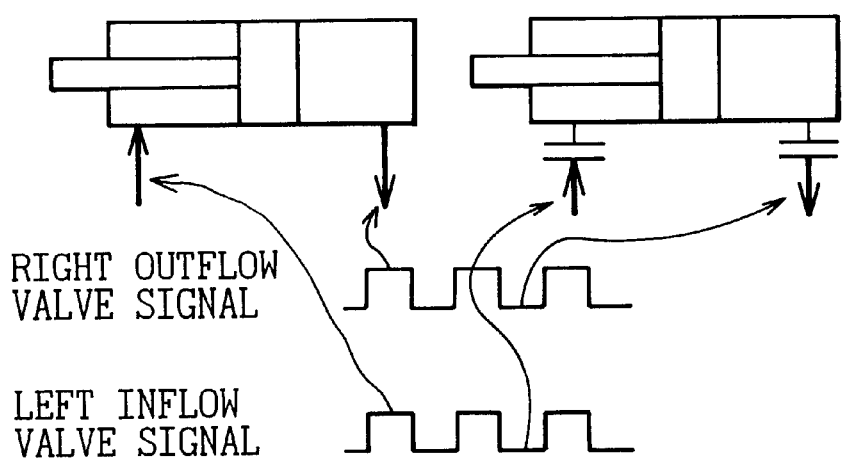
FIG. 3 is a schematic illustration showing two states (a) and (b) in which valves on the inflow side and the outflow side of a hydraulic cylinder are controlled being opened and closed at the same phase.
Figure 4:
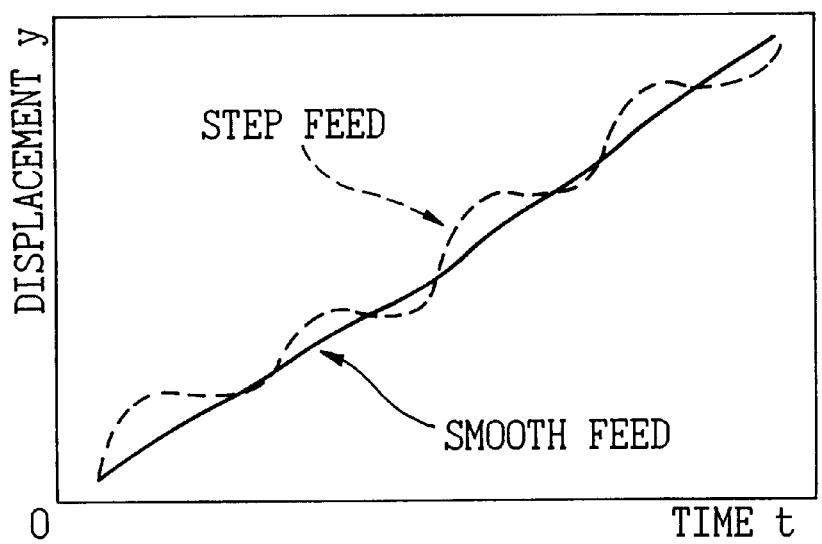
FIG. 4 is a diagram for explaining a difference between step-like feed and smooth feed.
Figure 5:
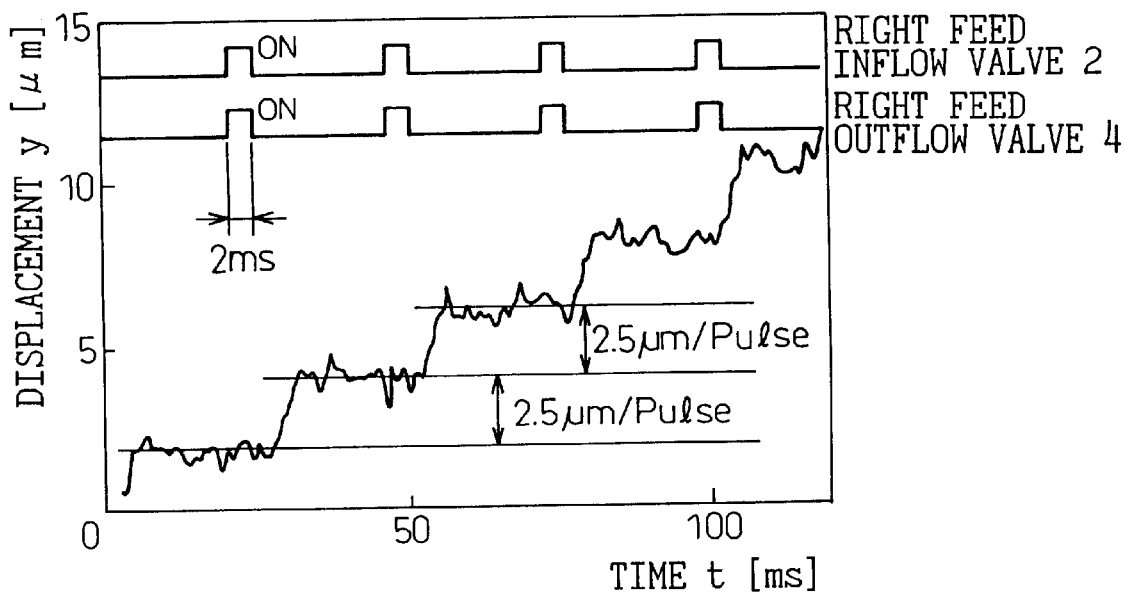
FIG. 5 is an actually measured diagram showing a relation between the valve driving time and the table displacement when valves of a hydraulic cylinder on the inflow side and the outflow side are opened and closed at the same phase.

In the case where the feed table 8 is moved to the right direction by a displacement y in FIG. 1, in order to conduct duty-control, in the initial condition shown in FIG. 1 in which all the valves 1 to 4 are closed, a stream of pulse signals of "step-like feed" illustrated in FIG. 2 are impressed upon the valves 1 to 4. Due to the foregoing, as shown in the two states of (a) and (b) in FIG. 3, when the right feed inflow valve 2 and the right feed outflow valve 4 are simultaneously opened and closed at the same phase, the feed table 8 is moved step-like as shown by broken lines in FIG. 4. This is defined as "step feed". The actually measured circumstances of "step feed" are shown in FIG. 5. Due to the above operation, it is possible to accomplish a movement the accuracy of which is of a micron order. Although it is "step feed", the corner of each step is chamfered because this system is hydraulic. Accordingly, in the process of machining or drilling, it is possible to reduce a sudden change in a load given to a cutting tool. Further, the hydraulic system is advantageous in that the damping property is high. Therefore, it is possible to prevent the occurrence of chatter marks.

In the same manner as described above, when the feed table 8 is moved to the left in FIG. 1, the pulse signal of the same phase as that described before is simultaneously given to the left feed outflow valve 1 and the left feed inflow valve 3. Due to the foregoing, the valves 1, 3 are repeatedly opened and closed. Therefore, the piston 6 and the table 8 are moved to the left by "step feed" by the distance corresponding to the number of the given pulses. In this connection, in FIG. 1, reference numeral 10 is a relief valve, reference numeral 11 is a computer, which is a control means for generating a stream of pulse signals, and reference numeral 12 is an amplifier for amplifying a signal.

Figure 6:
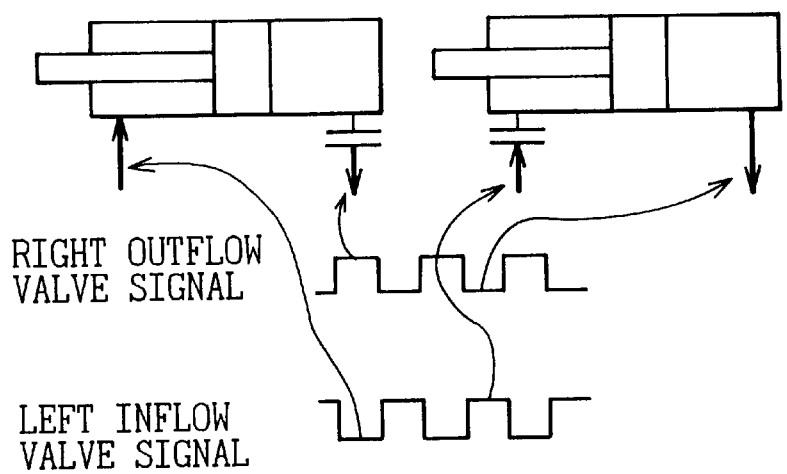
FIG. 6 is a schematic illustration showing two states (a) and (b) in which valves on the inflow side and the outflow side of a hydraulic cylinder are controlled being opened and closed at the inverse phase.

Next, a control means for changing the above step-like feed motion to a smooth feed motion in the system of the first embodiment shown in FIG. 1 will be explained below. As shown in FIG. 6, when phases of the streams of pulse signals impressed upon the right feed inflow valve 2 and the right feed outflow valve 4 are shifted from each other by 180° so that the phases of the streams of pulse signals can be inverse from each other, duty control is conducted, and the mode of operation is made to be a "smooth feed" shown in FIG. 2. In this way, it is possible to realize a smooth feed motion that is substantially similar to a straight line as shown in FIG. 4.

Figure 7:
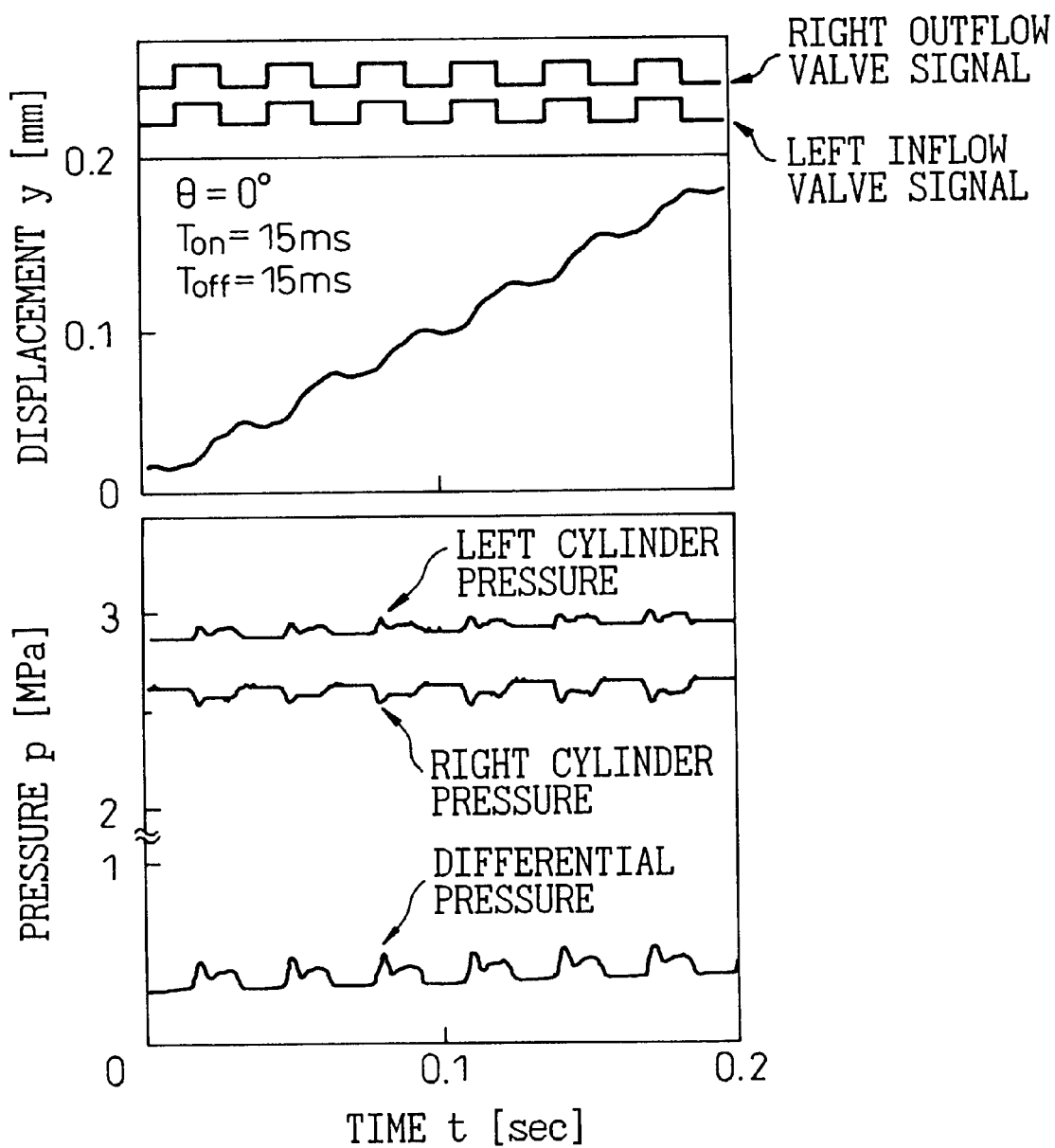
Figure 8:
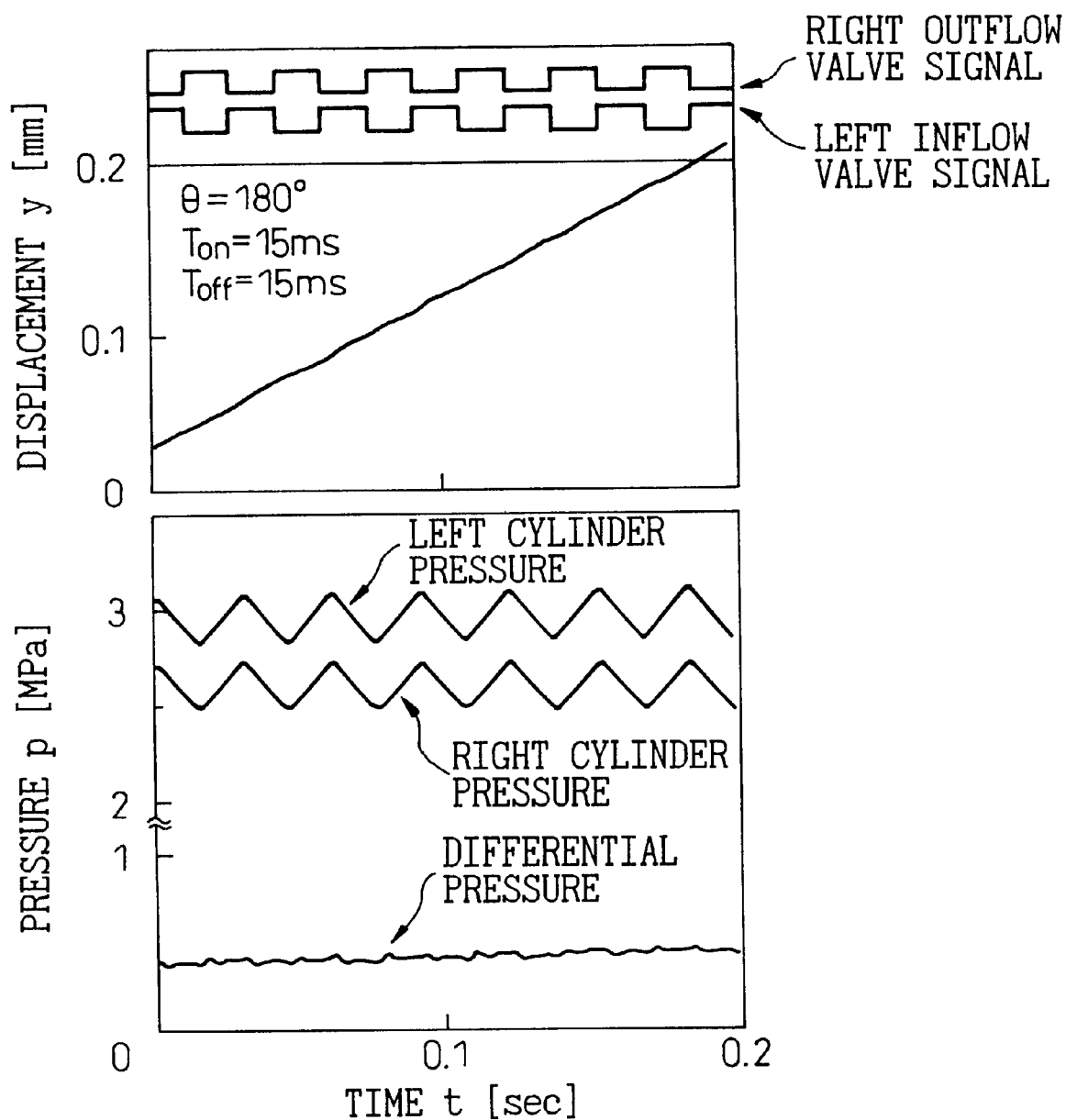

In the case of step feed in which the valve opening period on the inflow side with respect to the hydraulic cylinder 5 and the valve opening period on the outflow side are made to be the same phase, and in the case of smooth feed in which the valve opening period on the inflow side with respect to the hydraulic cylinder 5 and the valve opening period on the outflow side are made to be the inverse phase from each other, the actually measured circumstances of table feed are shown in FIGS. 7 and 8. FIG. 7 is a diagram showing a case of the same phase, and FIG. 8 is a diagram showing a case of the inverse phase in which the phase is shifted by 180°. In the case of FIG. 7 in which a step feed is shown, although the curve of displacement is step-like, it is not square. The reason why the curve of displacement is not square is that hydraulic fluid has some compressibility. The reason why the curve of displacement seldom fluctuates and it is possible to realize a smooth feed close to a straight line is that a difference in pressure, which changes every moment between the hydraulic chambers 14, 15 arranged on both sides of the piston 6 in the hydraulic cylinder 5 is smaller than that in the case shown in FIG. 7. In the case shown in FIG. 8, in order to realize a smooth feed, the most appropriate condition exists. Therefore, it is preferable that the operating condition is fitted to the most appropriate condition.

Figure 9:
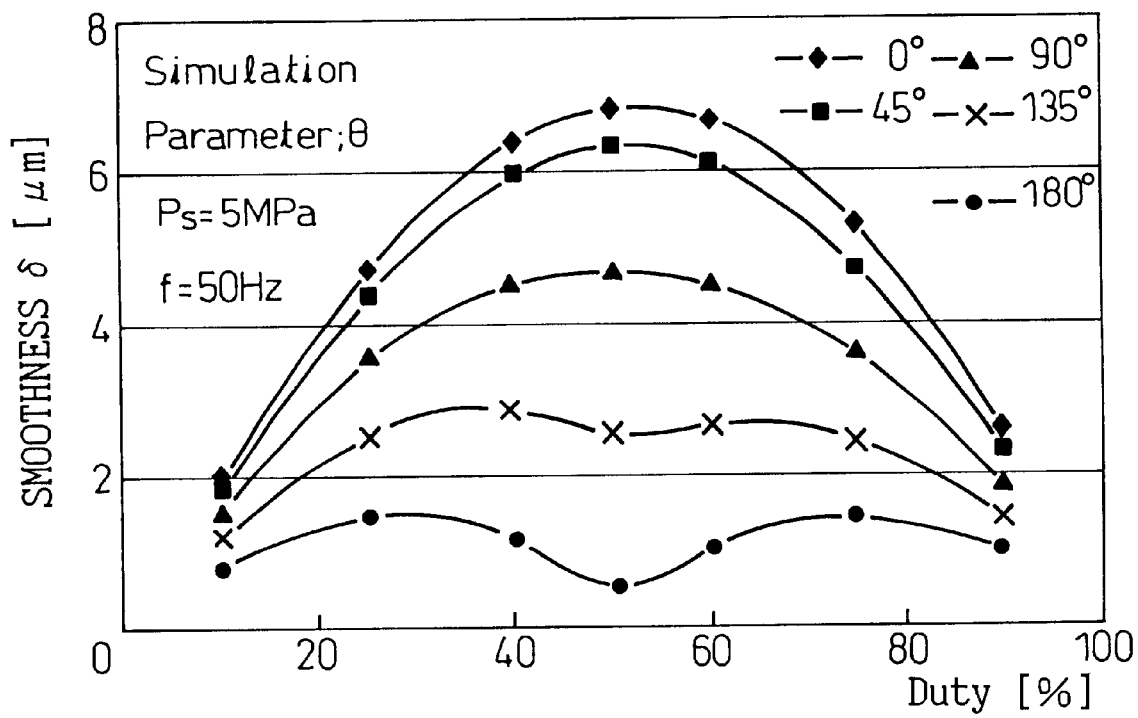
FIG. 9 is a diagram showing a relation between the duty ratio, which is determined by the ON time, and the smoothness of a table displacement, wherein a difference in the phase between the inflow side valve and the outflow side valve of a hydraulic cylinder is used as a parameter.
Figure 10:
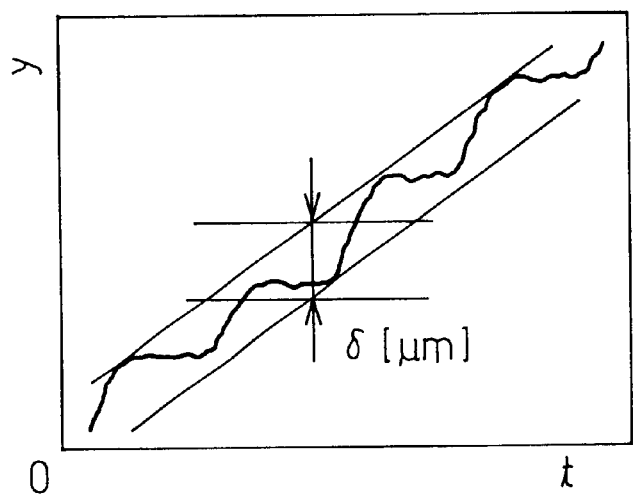
FIG. 10 is a diagram showing the definition of smoothness δ.

A degree of smoothness, which can be realized by the duty ratio (ratio of ON time with respect to one period) and the phase difference (phase of the valve 4 with respect to valve 2, or phase of valve 3 with respect to valve 1), is shown in FIG. 9. FIG. 9 shows how the smoothness $\delta$ ($\mu$m) changes with respect to the duty ration (%) when the phase difference $\theta$, which is a parameter of the simulation, is changed to 0°, 45°, 90°, 135° and 180°. From FIG. 9, it is possible to understand that the most excellent smoothness (the lowest value of smoothness) can be obtained when the duty ratio is 50% and the phase difference is 180°. In this connection, it has been confirmed that the feed speed seldom changes when the phase difference is given as described above. The definition of the smoothness $\delta$ shown in FIG. 9 is shown in FIG. 10. That is, the curve shown in FIG. 10 is the same as the curve shown in FIG. 7. An interval between the two straight lines coming into contact with the curve in the vertical axis direction is defined as "smoothness $\delta$".

As another means for realizing a smooth feed in this system, it is possible to consider a high level of duty control by which a stream of pulse signals are made to be as minute as possible. Due to the foregoing, it is possible to reduce the width of a step portion. However, when this method is carried out, the feed speed of the table 8 is lowered. Therefore, in order to make up for the drop in the feed speed, it becomes necessary to provide an ON-OFF valve capable of opening and closing at high speed, the operation time of which is not more than several $\mu$ sec. For the above reasons, it is almost impossible to execute the above method at present. If the above method is executed, the manufacturing cost is raised, which is against the object of the present invention. As described above, according to the smooth feed of the first embodiment, it is possible to realize a smooth feed, which is like a smooth feed provided by an analog system, although it is a digital system in which control can be easily conducted by a simple system structure and a control method using a computer.

When a smooth feed is carried out by the system and the control method of the first embodiment, it is possible to realize a smooth and stable feed for cutting. Therefore, it becomes possible to prevent the occurrence of feed marks, so that mirror face work of high quality can be accomplished. Further, the cutting tool can be prevented from being suddenly given a heavy load. Therefore, the life of the cutting tool can be extended. On the contrary, when step-like step feed is applied to cutting, a load given to the cutting tool can be generally reduced by the effect of vibration cutting. Therefore, this step-like step feed is effective as a countermeasure for preventing a cutting tool from being damaged in micro cutting, and it is possible to divide chips to an arbitrary length for disposing the chips. As described above, vibration cutting can be simply realized without adding a specific mechanism. Therefore, this method is very advantageous from the viewpoint of reducing the cost. Concerning the smoothness obtained by the first embodiment, like the feed motion of the conventional digital feed system in which the resolution is enhanced, the edges of the step-like waveform do not become square. Accordingly, as shown in FIGS. 7 and 8, the waveform is formed in such a manner that the edge portions are chamfered. Therefore, an impact force generated between the cutting tool and the workpiece by the table feed motion in the process of cutting can be remarkably reduced.

Figure 11:
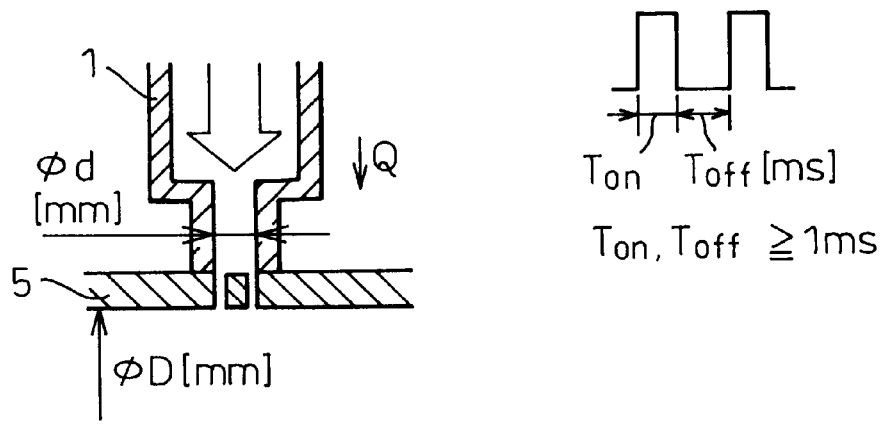
FIG. 11 is a schematic illustration showing a peripheral portion of a valve for explaining problems of the prior art.

Next, explanations will be made into a correlation between the feed speed and the feed resolution in the table feed system of the first embodiment shown in FIG. 1. In this case, a schematic illustration of a connecting portion of the left feed outflow valve 1 with the hydraulic cylinder 5 is shown in FIG. 11. In FIG. 11, an orifice diameter of the left feed outflow valve 1 is $\phi$ d (mm), an inner diameter of the hydraulic cylinder 5 is $\phi$ D (mm), and a flow rate of the hydraulic fluid flowing into the hydraulic cylinder 5 is Q. The response property (response rate) of the valve 1 is determined in such a manner that the minimum opening and closing time of the valve 1 is 1 ms. When the opening time of the valve 1 is $T_{ON}$ (ms) and the closing time of the valve 1 is $T_{OFF}$ (ms), resolution R ($\mu$m) can be expressed by the following expression 1.

$$R = T_{ON} \cdot A \tag{1}$$

In this case, A is determined by the design items and expressed as follows.

$$A = 4 \cdot Q(d)/\pi D^2 \tag{2}$$

According to the value of resolution R calculated above, feed speed V can be given as follows.

$$\begin{aligned} V &= 60 \cdot R/(T_{ON} + T_{OFF}) \\ &= 60 \times 4 \cdot Q(d)/\pi D^2 (1 + T_{OFF}/T_{ON}) \\ &= 240 \cdot Q(d)/\pi D^2 (1 + T_{OFF}/T_{ON}) \end{aligned} \tag{3}$$

Accordingly, the following can be said. When $T_{OFF}$ and $T_{ON}$ are respectively substituted with 1 ms in the expression (3), it can be understood that the relation between feed speed V and resolution R is expressed by a straight broken line, the taper of which is 30, shown in FIG. 12. When the design specification (items) of the valve 1 and the hydraulic cylinder 5 is determined, the value of A in the expression (1) can be determined. Since the minimum resolution is obtained when $T_{ON}$ is a minimum, it agrees with A. On the other hand, according to the expression (3), the maximum feed speed is 60A when the value of $T_{OFF}/T_{ON}$ is close to 0, that is, when the valve 1 is substantially opened.

Figure 12:
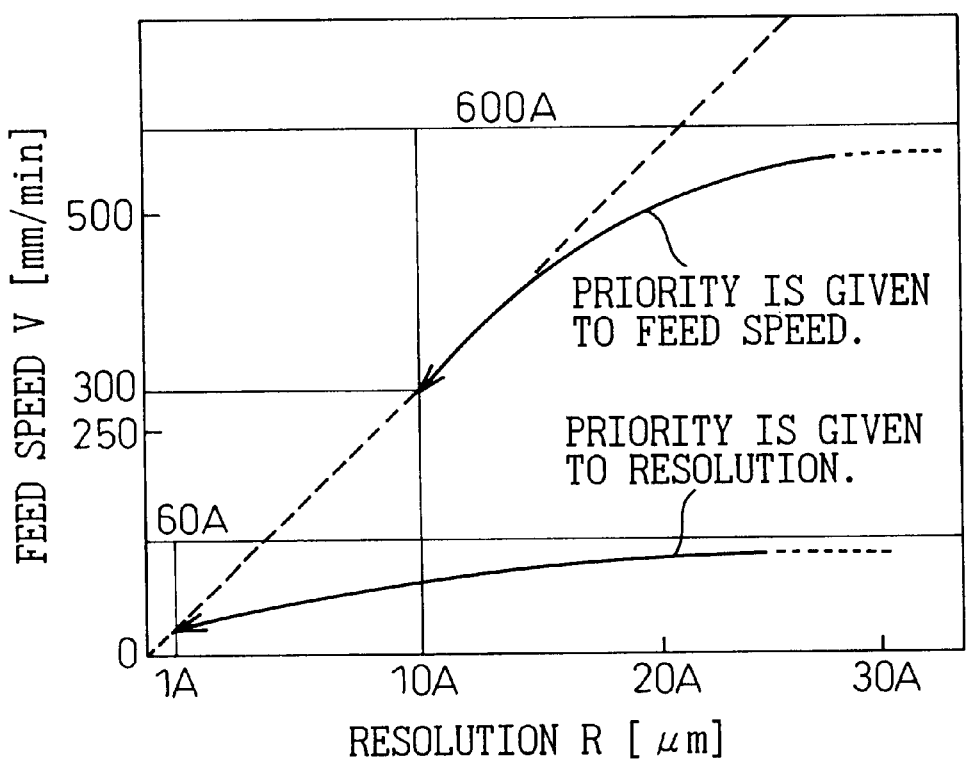
FIG. 12 is a diagram showing a relation between the feed speed and resolution.

When the above relation is expressed on a diagram, it is possible to obtain arrow lines shown in FIG. 12. The two arrow lines shown in FIG. 12 express the following. One arrow line expresses a case in which design is conducted while importance is attached to the resolution, and the other arrow line expresses a case in which design is conducted while importance is attached to the feed speed. In both cases, when resolution R is enhanced, the arrow line becomes close to a straight line in the lateral direction without limit. However, the arrow line cannot exceed the straight line in the lateral direction.

The maximum feed speed of the table 8 and the maximum resolution of this system depend upon the response property (the minimum opening and closing time) of the valve. When value A is determined by the designing specification, changes in feeding speed V and resolution R are limited into a range between the two arrow lines exemplarily shown in FIG. 12.

In the case where importance is attached to the feed speed, that is, in the case where priority is given to the feed speed, the designing specification is determined in such a manner that a valve of high flow rate is arranged and the diameter of the hydraulic cylinder is decreased. As can be clearly seen in the expressions described before, according to this specification, unless a valve of a very high responding speed is used, it is impossible to realize a high resolution. As another method, it is possible to add a valve of a minute flow rate to each valve. However, when this method is adopted, the following problems may be encountered. The number of valves is increased to eight in total. Therefore, the size of the feed table to which a large number of valves are attached is increased, and further the valve control becomes complicated.

Figure 13:
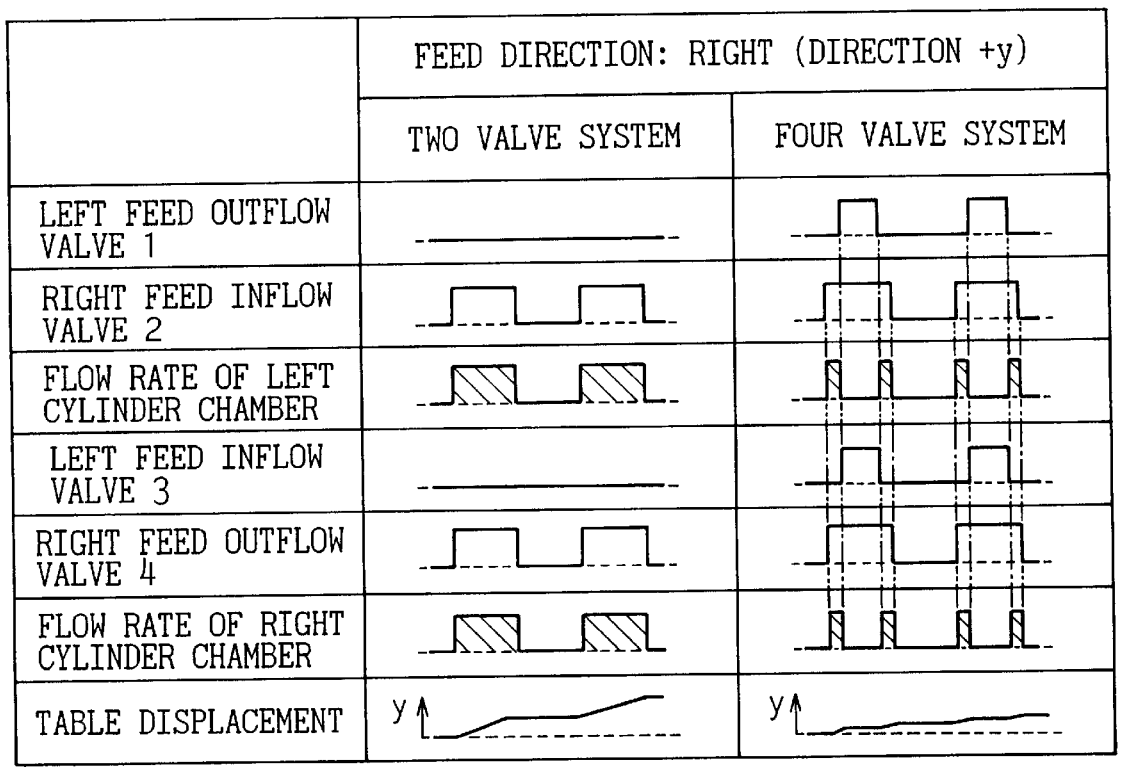
FIG. 13 is a table on which a stream of pulse signals impressed upon each valve in the second embodiment is exemplarily shown.

In order to solve the above problems, the second embodiment of the present invention is provided, in which the four valves 1 to 4 are simultaneously controlled. This second embodiment of the present invention will be explained as follows. In the second embodiment, for example, when the piston 6 is moved to the right in FIG. 1, the left feed outflow valve 1 and the left feed inflow valve 3, which are not substantially operated in this period in the first embodiment, are also energized at the time shown in FIG. 13. Due to the foregoing operation, the valves 1, 3 are opened, and an action, by which a portion of the effect provided by opening the right feed inflow valve 2 and the right feed outflow valve 4 is canceled, is generated. Therefore, even if the width of the pulse for driving the valves 2, 4 is extremely reduced, that is, the valve opening time is extremely reduced, the flow rate of hydraulic fluid flowing into the left hydraulic chamber 14 can be substantially made to be very small in the same manner as that of a case in which the valve 1 is opened in a period of time shorter than the minimum valve opening time.

Figure 14:
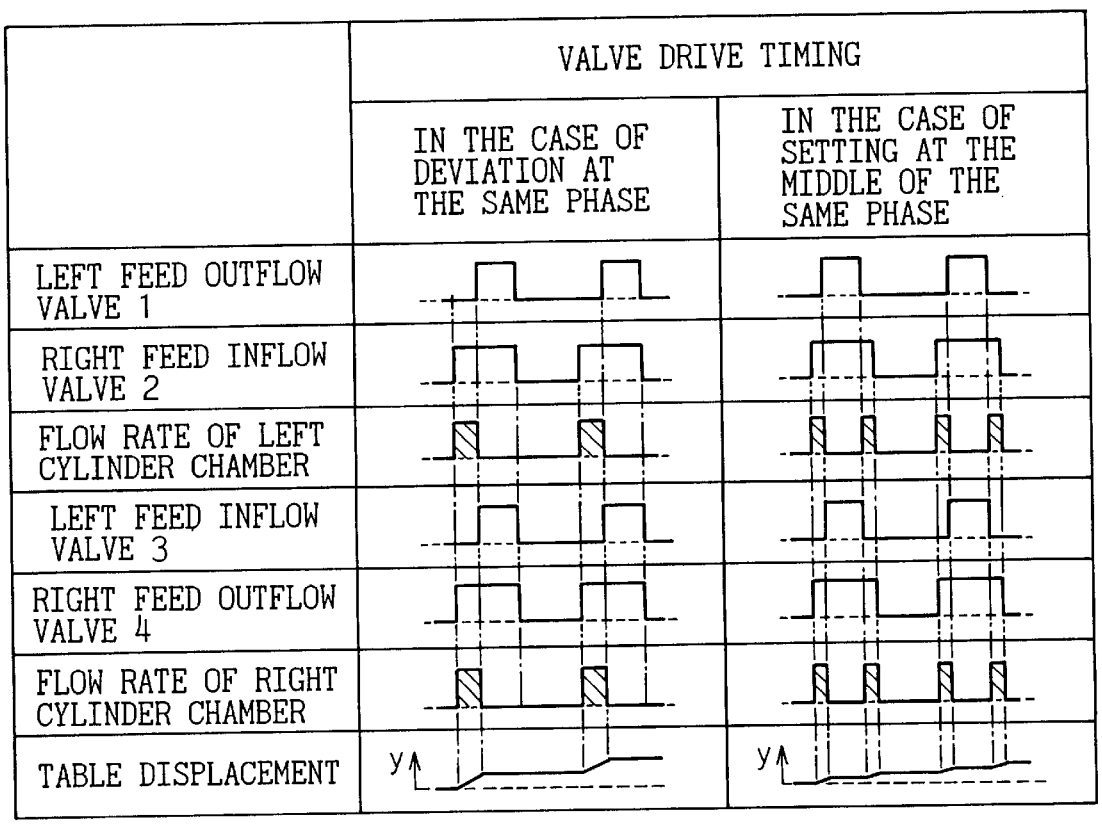
FIG. 14 is a table on which another stream of pulse signals impressed upon each valve in the second embodiment are exemplarily shown.

In order to realize a minute flow rate obtained by the short valve opening time not more than the minimum valve opening time by the valve of a normal response speed, ON-OFF periods of the valves 2, 4 may be made to be twice as long as the minimum valve opening time or made to be a constant value not less than that, and at the same time, the valve opening time of the valves 1, 3 may be changed in a range not less than the minimum valve opening time. A relatively high flow rate not less than the flow rate obtained by the minimum valve opening time can be obtained only by the operation of the valves 2, 4 as in the conventional manner. Concerning the operation time of the valves 1, 3 with respect to the operation time of the valves 2, 4, as shown on the right of the table shown in FIG. 14, when the operation time of the valves 1, 3 is set at the middle of the operation time of the valves 2, 4, it is possible to provide an excellent effect in the viewpoint of smoothness compared with a case in which the operation time of the valves 1, 3 is made to deviate to the rear (or the front) as exemplarily shown on the left of the table of FIG. 14.

As a variation of the second embodiment, it is possible to consider a three valve control system in which two valves are provided on the inflow side and only one common valve is provided on the outflow side so that the three valves are controlled in total. However, it is necessary that the flow rate on the right of the piston 6 is balanced with that on the left of the piston 6. Therefore, the aforementioned four valve control system, in which all the four valves are controlled, is more excellent in the viewpoints of positioning accuracy and stability in the case where an external force is given.

By the valve control of the second embodiment, it is possible to realize a minute flow rate exceeding the response property (the minimum valve opening time) of a single valve with respect to a pair of hydraulic chambers 14, 15 in the hydraulic cylinder 5. Therefore, it is possible to accomplish an accurate table feed, both the resolution and the feed speed of which are high. That is, in the case where a high feed speed is required, opening and closing drive only by the two valves may be conducted as described in the first embodiment. In the case where high resolution is required, opening and closing drive by the four valves may be conducted being combined with each other. In the present invention, all the valves can be controlled by the pulse signals. Therefore, the present invention is provided with high controllability which is a feature of digital control.

Figure 15:
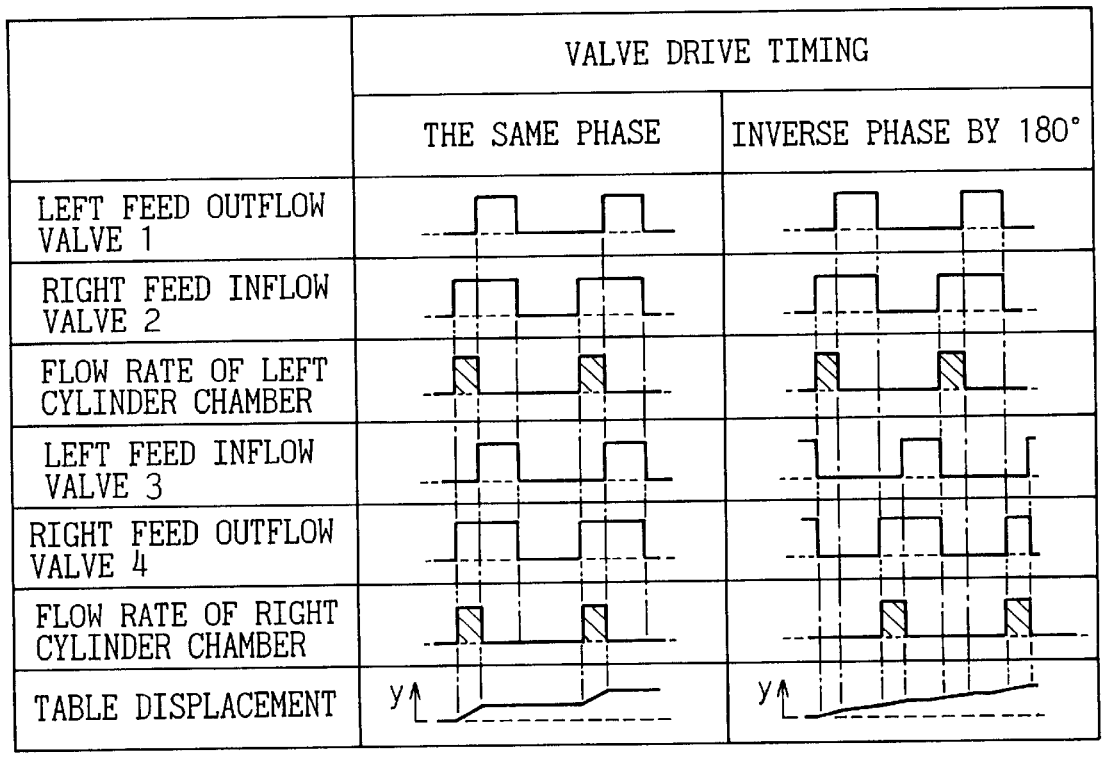
FIG. 15 is a table on which still another stream of pulse signals impressed upon each valve in the second embodiment are exemplarily shown.

As described in the first embodiment, when a portion of a plurality of valves are driven by an inverse phase, as shown in FIG. 8, it is possible to obtain the smoothness higher than that shown in FIG. 7, which can be also said in the second embodiment. As shown on the right of the following FIG. 15, when the operation time of the valve 2 is made to be inverse to that of the valve 4, and at the same time, when the operation time of the valve 1 is made to be inverse to that of the valve 3, a feeding motion can be more smoothly made than that of the case of the same phase shown on the left of FIG. 15 (which is the same as the case shown on the left of FIG. 14).

Next, the third embodiment of the present invention will be explained below. In the conventional hydraulic cylinder, there is provided an O-ring, which is inserted onto a sliding face formed between the cylinder and the piston so as to prevent hydraulic fluid from leaking out. Further, the control valve is formed differently from the hydraulic cylinder. Therefore, the control valve is connected with the hydraulic cylinder via piping. However, in order to realize a high response property of driving a piston, an elastic element such as an O-ring and a long hydraulic piping obstruct the enhancement of the response property. The third embodiment relates to a detailed structure of a hydraulic cylinder used for a hydraulic table feed system of each embodiment described before. The third embodiment is characterized in that an elastic element such as an O-ring and piping are omitted so as to realize a high control responding property.

In the table feed system described before, it is possible to realize a high responding property, high resolution and fast, smooth feeding motion by driving the ON-OFF valves 1 to 4 by pulses at high speed. However, in order to sufficiently exhibit the performance, it is preferable that an elastic element such as an O-ring made of rubber and an elastically deformed piping are omitted in a portion where these valves and the hydraulic cylinder are connected with each other. After the O-ring has been omitted, a mechanical seal or a pressure means for giving pressure by compressed air supplied from the outside is used. However, when the mechanical seal or the pressure means is used, the structure of the hydraulic cylinder becomes complicated, and further the number of parts is increased, which causes an increase in the manufacturing cost.

As a simple means for abolishing the O-ring, it is possible to adopt a method in which clearance between the piston and the hydraulic cylinder is reduced and further the length of the sliding face is extended as much as possible.

Figure 16:
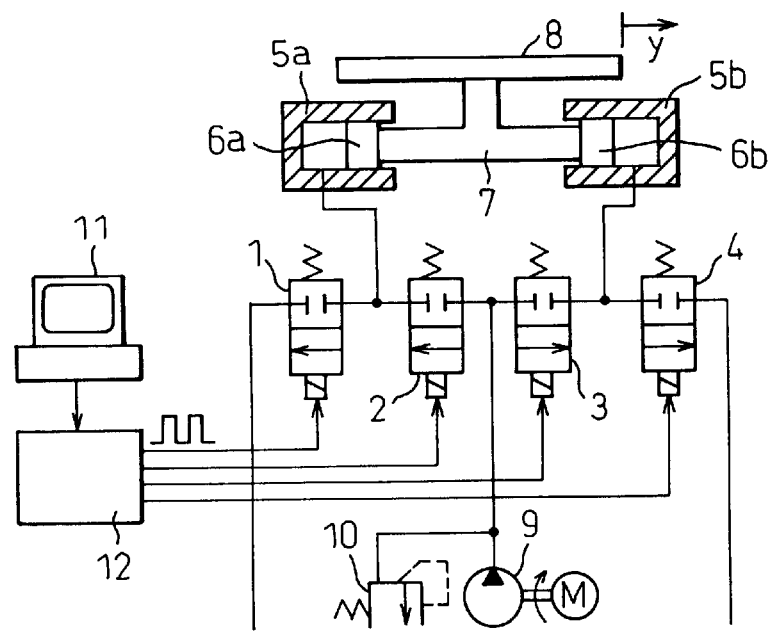
FIG. 16 is an overall arrangement view exemplarily showing a hydraulic type table feed system of the prior art.

When this method is applied to the conventional table feed system exemplarily shown in FIG. 16, it is necessary for a pair of pistons 6a, 6b attached to both ends of the piston rod 16 to be slidably engaged in a pair of hydraulic cylinders 5a, 5b via a small clearance of not more than several microns. In this case, unless the central axes of the two hydraulic cylinders 5a, 5b and those of the two pistons 6a, 6b are made to coincide with each other perfectly, it is impossible for the pistons 6a, 6b to smoothly slide in the hydraulic cylinders 5a, 5b. Therefore, it is necessary to highly accurately machine the two hydraulic cylinders 5a, 5b, the two pistons 6a, 6b inserted into the two hydraulic cylinders 5a, 5b, the piston rod 16 integrated with the two pistons 6a, 6b, and the feed table 8 integrated with the piston rod 16 and moving in parallel with the piston rod 16. Accordingly, it is very difficult to manufacture and assemble this system, and the manufacturing cost is raised.

Figure 17:
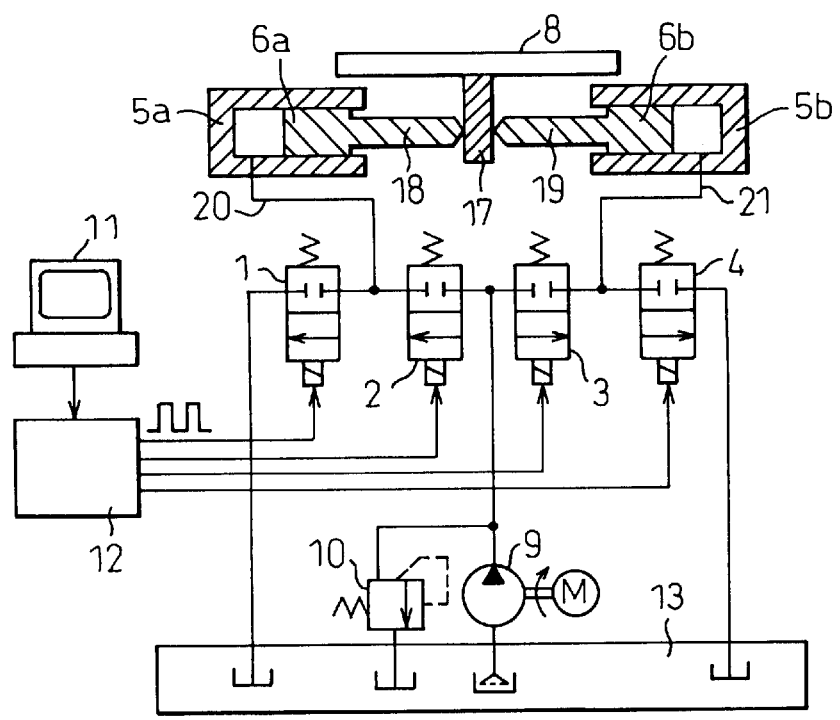
FIG. 17 is an overall arrangement view showing a hydraulic type table feed system of the third embodiment.

The system structure of the third embodiment of the present invention is shown in FIG. 17. The feed table 8 is provided with a narrow-width plate-shaped table drive piece 17, which is integrated with the feed table 8 into one body. When the table drive piece 17 is pushed by the pistons 6a, 6b arranged on both sides, the table drive piece 17 can be moved together with the feed table 8. In this case, the table drive piece 17 and the piston rods 18, 19 of the pistons 6a, 6b arranged on both sides come into contact with each other, however, they are not integrated into one body. For example, when the feed table 8 is moved to the right, pressure in the hydraulic chamber in the hydraulic cylinder 5a on the left becomes higher than pressure in the hydraulic chamber in the hydraulic cylinder 5b on the right. Therefore, the left piston 6a pushes the right piston 6b via the table drive piece 17 at all times. Accordingly, there is no possibility that these three parts are separated from each other although they are not integrated with each other into one body.

In order to stop the feed motion of the feed table 8, the outflow valves 1, 4 of the hydraulic cylinders 5a, 5b are simultaneously closed, or alternatively the inflow valves 2, 3 are closed late with respect to the outflow valves 1, 4. Due to the foregoing, it is possible to keep a state in which the pistons 6a, 6b push each other while the table drive piece 17 is interposed between them.

According to the structure of the third embodiment, unlike the structure of the conventional example shown in FIG. 16, there is no possibility that the piston rods 18, 19 are deformed by the weight of the feed table 8. Further there is no possibility that a portion including the feed table 8 and the pistons 6a, 6b is deformed by thermal expansion. Accordingly, the pistons 6a, 6b can be smoothly slid in the hydraulic cylinders 5a, 5b without being obstructed, that is, there is no factor to obstruct the smooth sliding motion of the pistons 6a, 6b in the hydraulic cylinders 5a, 5b. Consequently, it is possible to extremely reduce the clearance in the sliding portion so as to omit the O-ring. When the outflow valves 1 to 4 are respectively integrated with the related hydraulic cylinders 5a, 5b, it is possible to reduce the lengths of the hydraulic pipes 20, 21, and further it is possible to enhance the rigidity so as to solve the problems caused by elastic deformation of the pipes.

Figure 18:
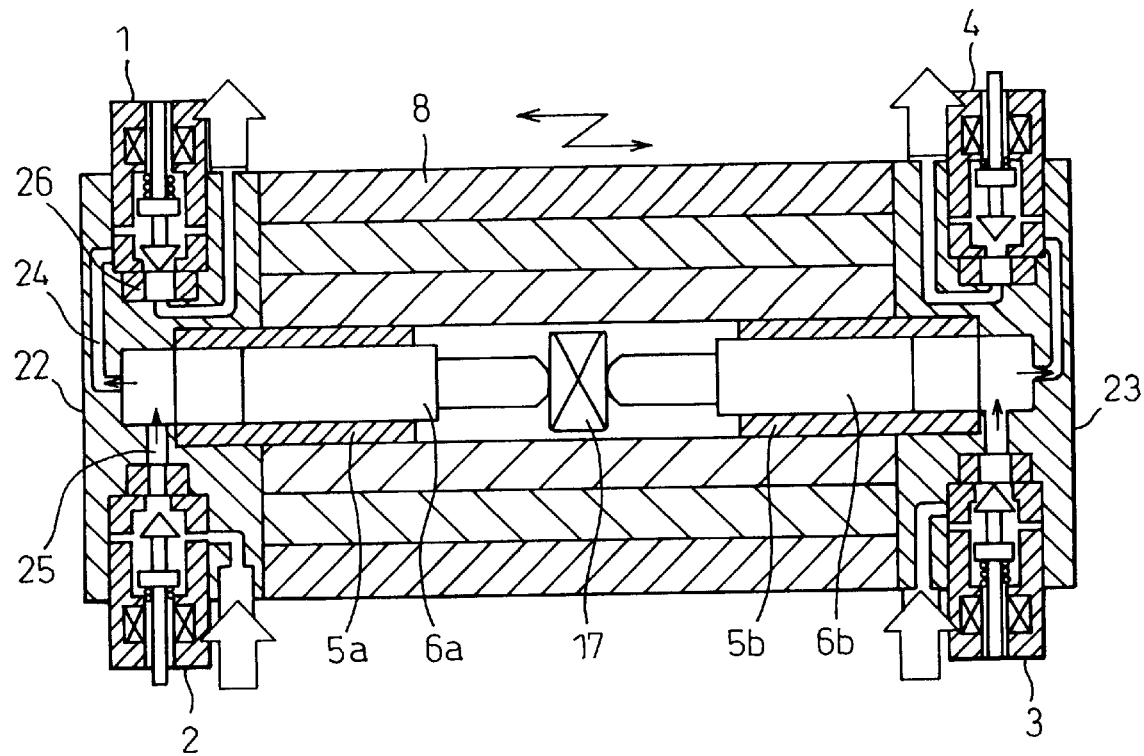
FIG. 18 is a longitudinal cross-sectional front view specifically showing a primary portion of the third embodiment.
Figure 19:
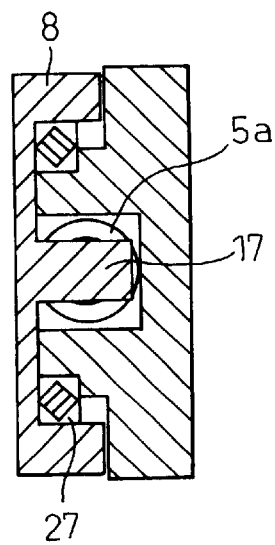
FIG. 19 is a lateral cross-sectional side view specifically showing a primary portion of the third embodiment.

FIGS. 18 and 19 are views showing an embodiment of the small table feed system, which is a more specific embodiment of the system structure of the third embodiment shown in FIG. 17. In this embodiment, the forward end portions of the piston rods 18, 19 are made round, so that the piston rods 18, 19 come into contact with the drive piece 17 by point contact. Due to the above structure, even if the central axes of the hydraulic cylinders 5a, 5b are relatively inclined with respect to those of the pistons 6a, 6b, or even if the feed table 8 and the table drive piece 17 are inclined with respect to the original positions, the influence of the inclination is canceled by this structure without causing any problems. Therefore, no problems are caused in the motions of the pistons 6a, 6b and the feed table 8.

In the table feed system shown in FIGS. 18 and 19, in order to obtain a high responding property, the O-rings, which are commonly arranged in the pistons 6a, 6b, are abolished, and further the piping to connect the hydraulic cylinders 5a, 5b with the valves 1 to 4 is abolished. Therefore, the valves 1 to 4 are directly attached to the cylinder blocks 22, 23 in such a manner that the valves 1 to 4 are embedded in the cylinder blocks 22, 23. For example, the lengths of the highly rigid paths 24, 25 formed in the cylinder block 22 for the valves 1, 2 relating to the left hydraulic cylinder 5a are reduced to the minimum.

In the portion attaching the valve 1 to the cylinder block 22, no elastic O-ring is provided but a metal seal 26 is provided. In this case, the metal seal 26 is made of a metal, the Young's modulus of which is relatively low, such as copper or aluminum, so that the metal seal 26 can be easily deformed for enhancing the sealing property. In this connection, reference numeral 27 shown in FIG. 19 is a cross roller guide for smoothly moving the feed table 8. Due to the above structure, it is possible to omit elastically deformable portions such as an O-ring and piping, and further it is possible reduce the lengths of the paths of hydraulic fluid flowing from the valves 1 to 4 to the hydraulic cylinders 5a, 5b. Therefore, it is possible to avoid the problem of deterioration of the response property and also it is possible to avoid the problem of deterioration of accuracy caused by a pulsation of hydraulic fluid.

What is claimed is:

1. A table feed system comprising: a feed table; at least one hydraulic cylinder for moving the feed table in the traverse direction so as to position the feed table; at least one piston slidably inserted into the hydraulic cylinder; a pair of right and left hydraulic chambers formed in the hydraulic cylinder by the piston in the moving direction of the feed table; and a pressure adjusting mechanism capable of independently adjusting the pressure in the pair of right and left hydraulic chambers, wherein the pressure adjusting mechanism provides a time difference between the time at which the pressure in the right hydraulic chamber is adjusted and the time at which the pressure in the left hydraulic chamber is adjusted when the piston is moved in the traverse direction by increasing and decreasing the pressure in the right and left hydraulic chambers.

2. A table feed system according to claim 1, wherein the pressure adjusting mechanism for adjusting the pressure in the right and left hydraulic chambers is composed of a hydraulic fluid inflow valve and hydraulic fluid outflow valve which are independently controlled, and these valves are opened and closed by duty control.

3. A table feed system according to claim 2, wherein a time difference is generated between the time at which the pressure in the right hydraulic chamber is adjusted and the time at which the pressure in the left hydraulic chamber is adjusted when a phase difference is made between duty control of the hydraulic fluid inflow valve for one hydraulic chamber and duty control of the hydraulic fluid outflow valve for the other hydraulic chamber.

4. A table feed system according to claim 3, wherein when it is set that the valve opening period of one of the hydraulic fluid inflow valve and the hydraulic fluid outflow valve for the hydraulic chamber partially overlaps the valve opening period of the other valve and becomes longer, hydraulic fluid, at a very small flow rate flows into or flows out from the hydraulic chamber.

5. A table feed system according to claim 4, wherein an O-ring to be used as a seal means for tightly sealing clearance between the hydraulic cylinder and the piston inserted into it is omitted.

6. A table feed system according to claim 2, wherein when it is set that the valve opening period of one of the hydraulic fluid inflow valve and the hydraulic fluid outflow valve for the hydraulic chamber partially overlaps the valve opening period of the other valve and becomes longer, hydraulic fluid of a minute flow rate flows into or flows out from the hydraulic chamber.

7. A table feed system according to claim 2, wherein at least one of the valves is integrated with the cylinder block of the hydraulic cylinder into one body, and a flow path connecting the valve with the hydraulic chamber in the hydraulic cylinder is formed in the cylinder block.

8. A table feed system according to claim 2, wherein an O-ring to be used as a seal means for tightly sealing a joint of a hydraulic fluid path connecting the valve with the hydraulic chamber in the hydraulic cylinder is omitted and a metal seal is used instead of the O-ring.

9. A table feed system according to claim 1, wherein the hydraulic cylinder is composed of a pair of hydraulic cylinders, one being arranged on the right and the other being arranged on the left, and forward end portions of piston rods of a pair of pistons respectively inserted into the right and left hydraulic cylinders are opposed to each other interposing a drive piece connected to the feed table, so that the forward end portions of the piston rods come into contact with the drive piece for driving the table from the right and the left.

10. A table feed system according to claim 9, wherein the forward end portions of the piston rods come into contact with the table drive piece by point contact from the right and the left.

11. A table feed system according to claim 1, wherein an O-ring to be used as a seal means for tightly sealing clearance between the hydraulic cylinder and the piston inserted into it is omitted.

12. A table feed system comprising:
   a feed table;
   at least one hydraulic cylinder for moving the feed table in the traverse direction to position the feed table;
   at least one piston slidably inserted into the hydraulic cylinder;
   a pair of right and left hydraulic chambers formed in the hydraulic cylinder by the piston in the moving direction of the feed table;
   a left feed outflow valve and a right feed inflow valve connected with the left hydraulic chamber;
   a left feed inflow valve and a right feed outflow valve connected with the right hydraulic chamber;
   a means for supplying pressurized hydraulic fluid to the right feed inflow valve and the left feed inflow valve;
   a means for receiving hydraulic fluid discharged from the left feed outflow valve and the right feed outflow valve; and
   a control means for opening and closing the plurality of valves by duty control when a stream of pulse signals are generated for independently controlling the pressure of hydraulic fluid in the pair of hydraulic chambers, wherein when the feed table is moved to the left, the left feed outflow valve and the left feed inflow valve are opened at the substantially inverse phase to each other by a stream of pulse signals generated by the control means, and when the feed table is moved to the right, the right feed outflow valve and the right feed inflow valve are opened at the substantially inverse phase to each other by a stream of pulse signals generated by the control means.

13. A table feed system comprising:
   a feed table;
   at least one hydraulic cylinder for moving the feed table in the traverse direction so as to position the feed table;
   at least one piston slidably inserted into the hydraulic cylinder;
   a pair of right and left hydraulic chambers formed in the hydraulic cylinder by the piston in the moving direction of the feed table;
   a left feed outflow valve and a right feed inflow valve connected with the left hydraulic chamber;
   a left feed inflow valve and a right feed outflow valve connected with the right hydraulic chamber;
   a means for supplying pressurized hydraulic fluid to the right feed inflow valve and the left feed inflow valve;
   a means for receiving hydraulic fluid discharged from the left feed outflow valve and the right feed outflow valve; and
   a control means for opening and closing the plurality of valves by duty control when a stream of pulse signals are generated for independently controlling the pressure of hydraulic fluid in the pair of hydraulic chambers, wherein when the feed table is moved to the left, the right feed outflow valve is opened by a stream of pulse signals generated by the control means, at the same time the left feed inflow valve is opened for a period of time longer than that at the substantially same phase, further at the same time the right feed inflow valve is opened and the left feed outflow valve is opened for a period of time longer than that at the substantially same phase, and when the feed table is moved to the right, the left feed outflow valve is opened by a stream of pulse signals generated by the control means, at the same time the right feed inflow valve is opened for a period of time longer than that at the substantially same phase, and further at the same time the left feed inflow valve is opened and the right feed outflow valve is opened for a period of time longer than that at the substantially same phase.

14. A table feed system according to claim 13, wherein when the feed table is moved to the left, the valve opening period of the right feed outflow valve is in the middle of the valve opening period of the left feed inflow valve, and further the valve opening period of the right feed inflow valve is in the middle of the valve opening period of the left feed outflow valve, and on the other hand, when the feed table is moved to the right, the valve opening period of the left feed outflow valve is in the middle of the valve opening period of the right feed inflow valve, and further the valve opening period of the left feed inflow valve is in the middle of the valve opening period of the right feed outflow valve.

15. A table feed system comprising:
   a feed table;
   at least one hydraulic cylinder for moving the feed table in the traverse direction so as to position the feed table;
   at least one piston slidably inserted into the hydraulic cylinder;
   a pair of right and left hydraulic chambers formed in the hydraulic cylinder by the piston in the moving direction of the feed table;
   a left feed outflow valve and a right feed inflow valve connected with the left hydraulic chamber;
   a left feed inflow valve and a right feed outflow valve connected with the right hydraulic chamber;
   a means for supplying pressurized hydraulic fluid to the right feed inflow valve and the left feed inflow valve;
   a means for receiving hydraulic fluid discharged from the left feed outflow valve and the right feed outflow valve; and a control means for opening and closing the plurality of valves by duty control when a stream of pulse signals are generated for independently controlling the pressure of hydraulic fluid in the pair of hydraulic chambers, wherein when the feed table is moved to the left, the right feed outflow valve is opened by a stream of pulse signals generated by the control means and at the same time the left feed inflow valve is opened for a longer period of time than that at the substantially same phase, and further the right feed inflow valve is simultaneously opened at the inverse phase and at the same time the left feed outflow valve is opened for a longer period of time than that at the substantially same phase, and on the other hand when the feed table is moved to the right, the left feed outflow valve is opened by a stream of pulse signals generated by the control means and at the same time the right feed inflow valve is opened for a longer period of time than that at the substantially same phase, and further the left feed inflow valve is simultaneously opened at the inverse phase and at the same time the right feed outflow valve is opened for a longer period of time than that at the substantially same phase.

16. A table feed system comprising:

a feed table;

at least one hydraulic cylinder for moving the feed table in the traverse direction so as to position the feed table;

at least one piston slidably inserted into the hydraulic cylinder;

a pair of right and left hydraulic chambers formed in the hydraulic cylinder by the piston in the moving direction of the feed table;

a left feed outflow valve and a right feed inflow valve connected with the left hydraulic chamber;

a left feed inflow valve and a right feed outflow valve connected with the right hydraulic chamber;

a means for supplying pressurized hydraulic fluid to the right feed inflow valve and the left feed inflow valve;

a means for receiving hydraulic fluid discharged from the left feed outflow valve and the right feed outflow valve; and a control means for opening and closing the plurality of valves by duty control when a stream of pulse signals are generated for independently controlling the pressure of hydraulic fluid in the pair of hydraulic chambers, wherein the hydraulic cylinder is composed of a pair of hydraulic cylinders, one being arranged on the right and the other being arranged on the left, and forward end portions of piston rods of a pair of pistons respectively inserted into the right and left hydraulic cylinders are opposed to each other interposing a drive piece connected to the feed table, so that the forward end portions of the piston rods come into contact with the drive piece for driving the table from the right and the left.

17. A table feed system according to claim 16, wherein the forward end portions of the piston rods come into contact with the table drive piece by point contact from the right and the left.

18. A table feed system comprising:

a feed table;

at least one hydraulic cylinder for moving the feed table in the traverse direction so as to position the feed table;

at least one piston slidably inserted into the hydraulic cylinder;

a pair of right and left hydraulic chambers formed in the hydraulic cylinder by the piston in the moving direction of the feed table;

a left feed outflow valve and a right feed inflow valve connected with the left hydraulic chamber;

a left feed inflow valve and a right feed outflow valve connected with the right hydraulic chamber;

a means for supplying pressurized hydraulic fluid to the right feed inflow valve and the left feed inflow valve;

a means for receiving hydraulic fluid discharged from the left feed outflow valve and the right feed outflow valve; and a control means for opening and closing the plurality of valves by duty control when a stream of pulse signals are generated for independently controlling the pressure of hydraulic fluid in the pair of hydraulic chambers, wherein at least one of the valves is integrated with the cylinder block of the hydraulic cylinder into one body, and a flow path connecting the valve with the hydraulic chamber in the hydraulic cylinder is formed in the cylinder block.

* * * * *